(12) United States Patent
Le Moal et al.

(10) Patent No.: US 7,768,161 B2
(45) Date of Patent: Aug. 3, 2010

(54) METHOD AND DEVICE FOR MOVING AN ELEMENT TO BE DRIVEN USING AN ACTUATING ELEMENT FORMED BY ETCHING IN A SEMICONDUCTOR MATERIAL

(75) Inventors: Patrice Le Moal, Besancon (FR); Gilles Bourbon, Besancon (FR); Patrice Minotti, Gennes (FR); Eric Joseph, Chaucenne (FR)

(73) Assignee: Silmach, Besancon (FR)

( * ) Notice: Subject to any disclaimer, the term of this patent is extended or adjusted under 35 U.S.C. 154(b) by 98 days.

(21) Appl. No.: 11/886,512

(22) PCT Filed: Mar. 15, 2006

(86) PCT No.: PCT/EP2006/060758

§ 371 (c)(1),
(2), (4) Date: Sep. 17, 2007

(87) PCT Pub. No.: WO2006/097491

PCT Pub. Date: Sep. 21, 2006

(65) Prior Publication Data

US 2008/0150391 A1    Jun. 26, 2008

(30) Foreign Application Priority Data

Mar. 18, 2005 (FR) .................................. 05 02699

(51) Int. Cl.
*H02K 7/07* (2006.01)
*H02N 1/00* (2006.01)
(52) U.S. Cl. ............... 310/20; 310/12.03; 310/40 MM; 310/80; 310/83; 310/309; 74/128

(58) Field of Classification Search ................. 310/306, 310/309, 12.03, 12.14, 12.17, 20, 40 MM, 310/40.5, 83; 192/108
See application file for complete search history.

(56) References Cited

U.S. PATENT DOCUMENTS

| 3,202,842 | A | * | 8/1965 | Sherwood | .................... 307/141 |
| 3,204,133 | A | * | 8/1965 | Tschudin | ...................... 310/22 |
| 3,744,326 | A | * | 7/1973 | Hetzel et al. | .................. 74/128 |
| 5,631,514 | A | * | 5/1997 | Garcia et al. | ................ 310/309 |

(Continued)

FOREIGN PATENT DOCUMENTS

FR             2 809 549         11/2001

(Continued)

*Primary Examiner*—Burton Mullins
(74) *Attorney, Agent, or Firm*—Pauley Petersen & Erickson

(57) ABSTRACT

A device comprising an element to be driven and a driving element designed to be urged into engagement with the element to be driven and an actuating element adapted to generate a reciprocating movement to move the driving element, the driving element and the actuating element being formed by etching in a semiconductor material block, are provided. During a first alternation (a) of the movement generated by the actuating element, the driving element is urged into engagement with the element to be driven to pull the element to be driven. During a second alternation (b) in the opposite direction generated by the actuating element, the driving element slides on the element to be driven, such that the element to be driven is displaced in a step-by-step movement by the driving element.

23 Claims, 4 Drawing Sheets

U.S. PATENT DOCUMENTS

| | | | |
|---|---|---|---|
| 5,959,376 A * | 9/1999 | Allen | 310/40 MM |
| 6,211,599 B1 * | 4/2001 | Barnes et al. | 310/309 |
| 6,313,562 B1 | 11/2001 | Barnes et al. | |
| 6,465,929 B1 | 10/2002 | Levitan et al. | |
| 7,567,011 B1 * | 7/2009 | Jean et al. | 310/306 |
| 7,592,737 B2 * | 9/2009 | Bourbon et al. | 310/309 |
| 2004/0156274 A1 * | 8/2004 | Miyazawa et al. | 368/255 |
| 2004/0159813 A1 * | 8/2004 | Sherman et al. | 251/208 |
| 2004/0227411 A1 * | 11/2004 | Hsiao et al. | 310/12 |

FOREIGN PATENT DOCUMENTS

| | | |
|---|---|---|
| FR | 2 852 111 | 9/2004 |
| WO | WO 01/09519 | 2/2001 |

\* cited by examiner

METHOD AND DEVICE FOR MOVING AN ELEMENT TO BE DRIVEN USING AN ACTUATING ELEMENT FORMED BY ETCHING IN A SEMICONDUCTOR MATERIAL

BACKGROUND OF THE INVENTION

1. Field of the Invention

The invention relates to the field of microelectromechanical systems (MEMS).

Such microelectromechanical systems can be formed by etching in blocks or wafers in a semiconductor material, generally in silicon.

2. Discussion of Related Art

Document FR 2 852 111 (published on Sep. 10, 2004) describes a clock device comprising a toothed wheel, a driving element capable of sequentially meshing with the toothed wheel and an actuator capable of displacing the driving element according to a hysteresis movement so that the driving element meshes with the successive teeth of the wheel. In such a device, the actuator comprises two electrostatic driving modules. One of the modules is capable of displacing the driving element along a radial direction relatively to the wheel and the other module is capable of displacing the driving element along a tangential direction relatively to the wheel.

This device requires the use of an addressing system so that the actuating electrostatic modules are controlled by out-of-phase signals to produce the hysteresis movement of the driving element. The hysteresis movement of the driving element generates rotation of the toothed wheel.

SUMMARY OF THE INVENTION

An object of the invention is to provide a simpler device for displacing an element to be driven.

For this purpose, the invention proposes a device comprising an element to be driven, a driving element intended to engage with the element to be driven, and an actuating element capable of generating a reciprocating movement in order to displace the driving element, the driving element and the actuating element being formed by etching in a block of semiconductor material, characterized in that it is arranged such that:

during a first alternation of the movement generated by the actuating element, the driving element engages with the element to be driven to pull the element to be driven, during a second alternation in the opposite direction generated by the actuating element, the driving element slides on the element to be driven, so that the element to be driven is displaced in a step-by-step movement by the driving element.

Such a device only requires a single actuating element and may operate by means of a single control signal.

Consequently the control or addressing of the device is simplified.

Further, the invention only requires a power supply for a single control or addressing route and thereby the power consumed by the device may be reduced as compared with a device with two modules.

The device of the invention may further have the following features:

the driving element has a driving face intended to come into contact with the element to be driven in order to pull the element to be driven during the first alternation and a guiding face intended to slide on the element to be driven during the second alternation, the driving element comprises a supporting face intended to limit the engagement of the driving element with the element to be driven, the element to be driven is a toothed element, the teeth of the element to be driven are asymmetrical, each tooth of the element to be driven has a driving face on which the driving element will come into contact in order to pull the element to be driven during a first alternation and a guiding face on which the driving element slides during a second alternation, the device is arranged so that:

during the first alternation, the driving element is engaged between two teeth of the element to be driven, during the second alternation, the driving element crosses one of the two teeth and will engage between two other adjacent teeth of the element to be driven, the driving element comprises at least one flexible leaf arranged so that during the first alternation, the driving element is displaced in a first direction, which causes deformation of the flexible leaf, and during the second alternation, the driving element is displaced in a second direction, opposite to the first direction, by elastic return of the flexible leaf, the driving element crosses one of the two teeth by restitution of residual elastic energy stored in the flexible leaf, the device comprises a non-return pawl capable of blocking the element to be driven during the second alternation, the non-return pawl comprises an indexing element capable of:

during the first alternation of the movement generated by the actuating element, sliding on the element to be driven, during the second alternation, engaging with the element to be driven in order to block the element to be driven, the pawl has a guiding face intended to slide on the element to be driven during the first alternation and a blocking face on which the element to be driven will come into contact in order to block the element to be driven during the second alternation, the element to be driven is a toothed element having a step, the driving element comprises a guiding face intended to come into contact with the element to be driven at a contact point during the sliding of the driving element on the element to be driven, and wherein at rest:

$$\begin{cases} d_2 \prec p - e + k \cdot p \\ d_2 \succ k \cdot p \end{cases}$$

wherein:

p is the step of the element to be driven, e is the distance between a contact point of the guiding face and the driving face of the driving element, $d_2$ is the distance between the contact point of the guiding face of the driving element and the blocking face of the pawl, and k is a positive integer, the device comprises an elastic pre-stressing component to maintain the driving element against the element to be driven.

The invention further proposes a method for operating the device as previously defined. The device comprising an element to be driven, a driving element and an actuating element, the driving element and the actuating element being formed by etching in a block of semiconductor material, characterized in that it comprises the steps according to which:

the actuating element is controlled so that it generates a reciprocating movement for displacing the driving element, during a first alternation of the movement generated by the actuating element, the driving element engages with the element to be driven to pull the element to be driven, during a second alternation in the opposite direction, generated by the actuating element, the driving element slides on the element to be driven, so that the element to be driven is displaced in a step-by-step movement by the driving element.

BRIEF DESCRIPTION OF THE DRAWINGS

Other features and advantages will become further apparent from the description which follows, which is purely illustrative and non-limiting, and should be read with reference to the appended drawings, wherein.

DETAILED DESCRIPTION OF THE INVENTION

Figure 1:
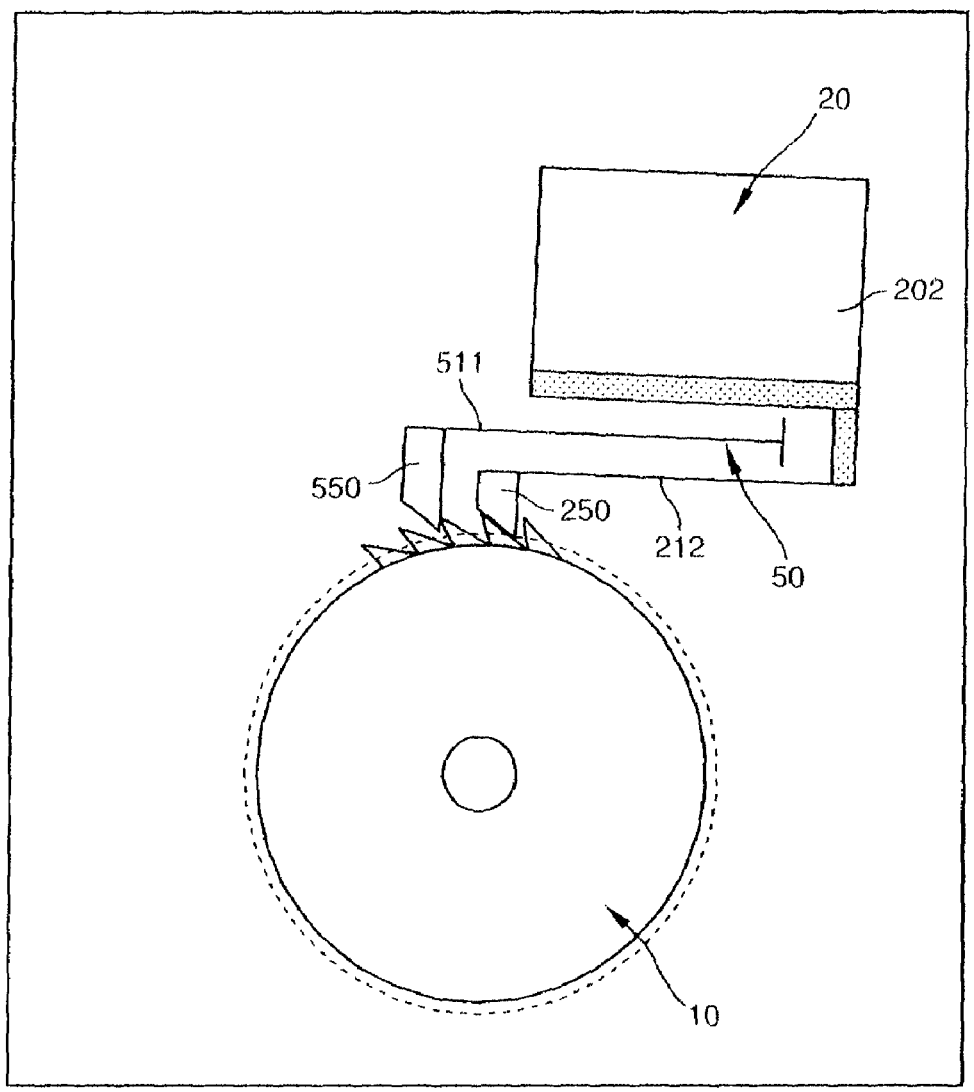
FIG. 1 schematically illustrates a device according to an embodiment of the invention.

In FIG. 1, the device comprises an element to be driven 10, a driving device 20 and an indexing device 50.

The driving device 20 and the indexing device 50 are simultaneously formed by micro-etching in a single block of semiconductor material, for example in silicon. The element to be driven 10 may also be formed in the same block or be added and positioned facing the driving device 20. The block thus forms a substrate on which the etched elements are arranged.

In the following text, the expression "fixed" describes any element fitted onto the substrate, and the expression "mobile" describes any element maintained at an altitude of a few microns from the substrate, by elastic suspensions also fitted onto the substrate.

The element to be driven 10 comprises a rotationally mobile toothed wheel.

The expression "radial" describes any element which extends along a radial direction relatively to the wheel, and the expression "tangential" describes any element extending along a tangential direction relatively to the wheel, the radial and tangential directions being considered at the point of the wheel where the driving device engages with the wheel.

The driving device 20 comprises an actuating element 202 capable of generating a reciprocating movement in a general tangential direction, a tangential flexible leaf 212 and a driving element 250 intended to engage with the toothed wheel 10. The driving element 250 is connected to the actuating element 202 via the tangential flexible leaf 212. The driving element 250 has the shape of a tooth intended to be engaged between two successive teeth of the toothed wheel.

The indexing device 50 comprises a tangential flexible leaf 511 and an indexing element 550 intended to engage with the toothed wheel 10. The indexing element 550 is connected to the substrate via a tangential flexible leaf 511. The indexing element 550 has the shape of a tooth intended to be engaged between two successive teeth of the toothed wheel.

Figure 2:
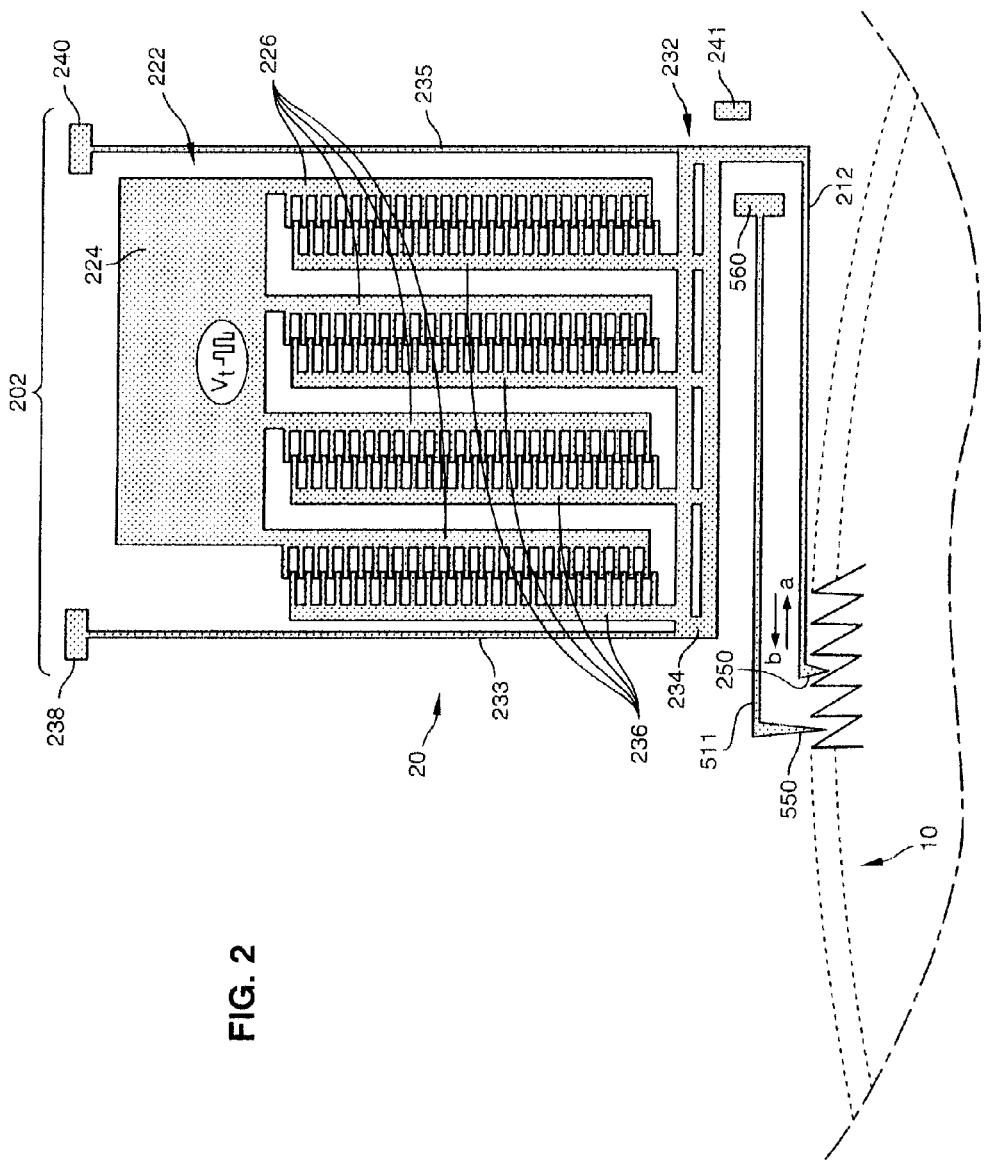
FIG. 2 schematically illustrates an actuating element.

As may be seen in FIG. 2, the actuating element 202 is an electrostatic actuating element having a comb structure (known as a comb drive). This type of structure comprises pairs of interdigitated combs.

The actuating module 202 is formed with a fixed portion 222 and a mobile portion 232 to which the tangential leaf 212 is connected.

The fixed portion 222 comprises a tangential electrode 224 from which a set of parallel fixed combs 226 extend along a radial direction. Each comb is formed with a main leaf and a series of parallel fingers or cilia connected to the main leaf and extended perpendicularly to the latter.

The mobile portion 232 comprises a mobile frame 234 including two flexible leaves 233 and 235 connected to the substrate by fitting blocks 238, 240. The flexible leaves 233 and 235 form elastic suspensions providing mobility of the frame 234 relatively to the substrate.

The mobile portion 232 comprises a set of combs 236 extending from the mobile frame 234 in a general radial direction. Each comb is formed with a main leaf and a series of parallel fingers or cilia connected to the main leaf and extending perpendicularly to the latter.

The combs 226 of the fixed portion 222 and the combs 236 of the mobile portion 232 are positioned parallel to each other and intercalated with each other. Further, each mobile comb 236 is positioned facing a fixed comb 226 so that the fingers are intercalated between each other thereby forming a pair of interdigitated combs.

The intercalated fingers of the interdigitated combs are similar to planar capacitors, one of the plates of which is connected to the electrode 224 and the other plate is connected to ground via the fitting connections 238, 240.

When a voltage is applied to the electrode 224, this voltage generates a difference in potentials between the fixed portion 222 and the mobile portion 232 of the actuating element 222. An electric field is established between the plates of the capacitors formed by the fingers of the fixed combs 226 and the fingers of the mobile combs 236. This electric field generates an electrostatic force which tends to attract the mobile combs 236 towards the fixed combs 226 in the direction of the fingers. This electrostatic force causes the displacement of the frame 234 in the tangential direction and therefore the translation of the driving tooth 250 by action of the teeth 212 in a tangential direction relatively to the wheel 10 in a first direction (arrow a).

The actuating module 202 also comprises a fixed mechanical stop 241. The mechanical stop 241 limits the deformation of the mobile portion 232 of the actuating element 202 and therefore the stroke of the driving element 250.

When the voltage applied to the electrode 224 becomes zero, the frame 234 returns to its rest position by returning the elastic energy stored in the flexible leaves 233, 235. This elastic return phase has the effect of causing translation of the tooth 250 in a tangential direction relatively to the wheel 10 in a second direction (arrow b), opposite to the first direction.

In other words, in a first direction (arrow a), the movement of the actuating element 202 is generated by the electrostatic forces generated between the fixed 226 and mobile 236 combs, whereas in a second direction (arrow b), the movement of the actuating element 202 is generated by the elastic return forces due to the energy stored by the flexible leaves 233, 235 of the frame 234.

Thus, when an alternating signal $V_t$ is applied to the electrode 224 for addressing the actuating element 202, the actuating element generates an reciprocating movement in a tangential direction relatively to the wheel 10.

The stop 241 is arranged so that the driving element 250 is displaced in order to drive the wheel 10 by one step during an alternation (arrow a).

The method for operating the device will now be described.

Figure 3:
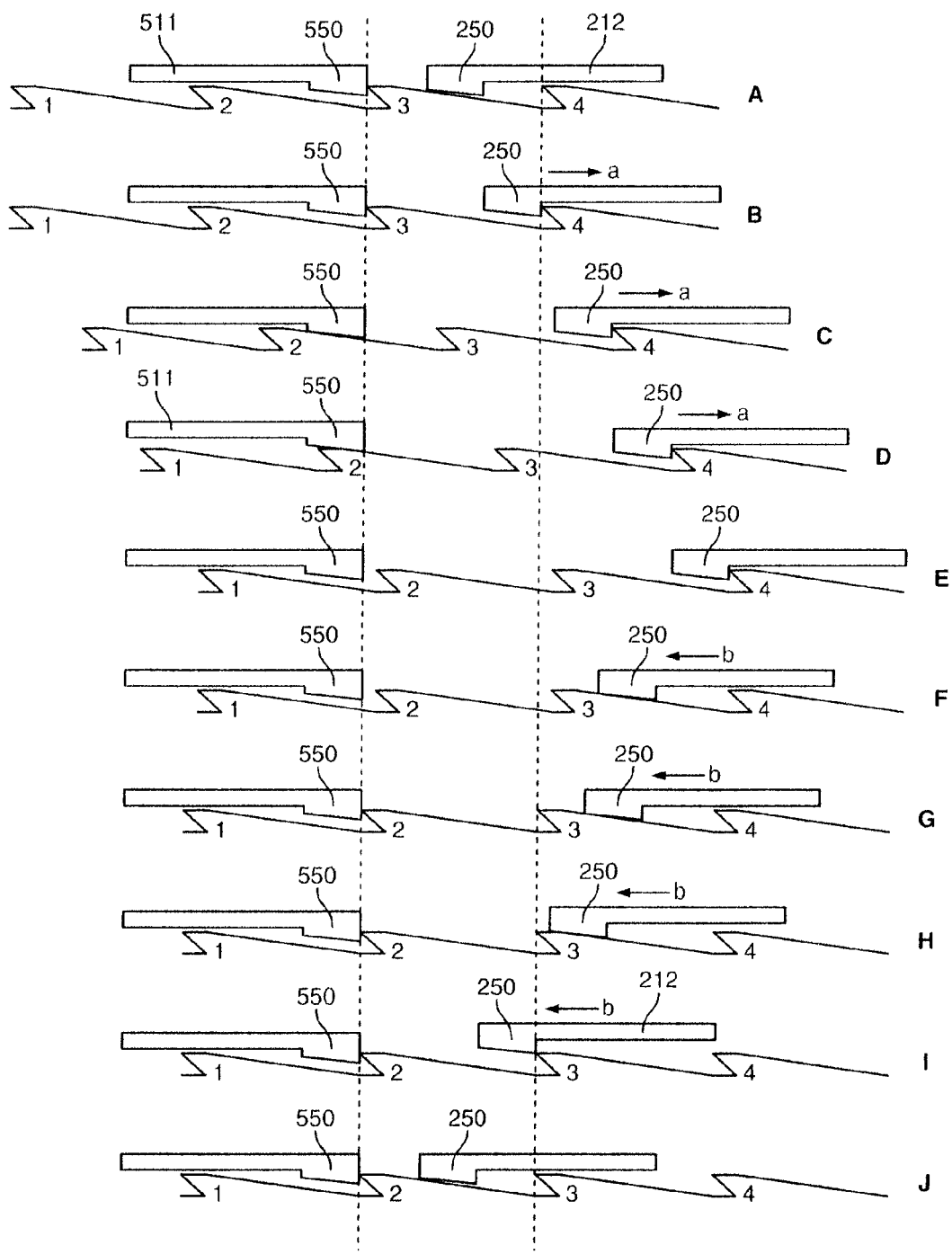
FIG. 3 schematically illustrates the relative positions of a driving element, of a non-return pawl and an element to be driven during the different operating steps of the device.

FIG. 3 schematically illustrates the relative positions of the driving element 250, the indexing element 550 and the wheel 10 during the displacement of the wheel when the actuating element generates a reciprocating movement. The movement generated by the actuator involves a first alternation or alternating movement, during which the driving element 250 is displaced in the direction a, and of a second alternation or alternating movement, during which the driving 250 is displaced in the direction b, opposite to the direction a.

In FIG. 3, the wheel 10 has at its circumference successive teeth referenced 1, 2, 3 and 4, respectively. The teeth 1, 2, 3 and 4 of the wheel 10 are asymmetrical. The configuration illustrated in FIG. 3 favors the driving of the wheel 10 in the clockwise direction.

Initially (in A), the indexing element 550 is engaged between two teeth 2 and 3 of the wheel 10. The driving element 250 is engaged between two teeth 3 and 4 of the wheel 10.

During the first alternation (an active alternation during which the movement of the driving element 250 is generated by electrostatic forces), the device operates according to the following steps:

According to a first step (B), the driving element 250 is driven into translation by the actuating element in a tangential direction relatively to the wheel 10 (arrow a). The driving element 250 comes into contact with the tooth 4.

According to a second step (C), the driving element 250 pulls the wheel 10 so that the wheel 10 is displaced in rotation in the clockwise direction.

Rotation of the wheel 10 has the effect that the indexing element 550 will come into contact with the tooth 2 of the wheel 10.

According to a third step (D), the rotation of the wheel 10 has the effect that the indexing element 550 slides on the tooth 2 of the wheel 10. This is possible because the leaf 511 is flexible and allows a movement of the indexing element 550 in a radial direction relatively to the wheel 10.

According to a fourth step (E), the indexing element 550 crosses the tooth 2. Because of its elasticity, the leaf 511 brings the indexing element back towards the wheel 10 so that the indexing element 550 is now found engaged between the teeth 1 and 2. The driving tooth 250 is found at its end-of-travel position.

During the second alternation (a passive alternation during which the movement of the driving element 250 is generated by the elastic return forces due to the energy stored in the elastic leaves 233, 235), the device operates according to the following steps:

According to a fifth step (F), the driving element 250 is driven into translation by the actuating element in a tangential direction relatively to the wheel (arrow b). The driving element 250 will come into contact with the tooth 3.

According to a sixth step (G), the driving element 250 pulls the wheel 10 so that the wheel 10 is displaced in rotation in the anti-clockwise direction. Rotation of the wheel 10 has the effect that the indexing element 550 will come into contact with the tooth 2 of the wheel 10.

According to a seventh step (H), the indexing element 550 blocks the rotation of the wheel 10. Blocking the wheel 10 has the effect that the driving element 250 slides on the tooth 3.

According to an eighth step (I), the driving element 250 crosses the tooth 3. Because of its elasticity, the leaf 212 brings the driving element 250 back towards the wheel 10 so that the driving element 250 is now found engaged between the teeth 2 and 3.

According to a ninth step (J), the driving element 250 has returned to its initial rest position (in A).

From the first to the ninth step, the wheel 10 was driven into rotation in the clockwise direction and was displaced by an angle corresponding to one tooth of the wheel.

Thus, the foregoing steps are repeated and the driving element 250 displaces the wheel 10 in a step-by-step movement, each step corresponding to one tooth of the wheel.

The indexing device 50 blocks the wheel in rotation when the driving element 250 returns to its rest position. The indexing device is a pawl which allows rotation of the wheel in a single direction.

Figure 4:
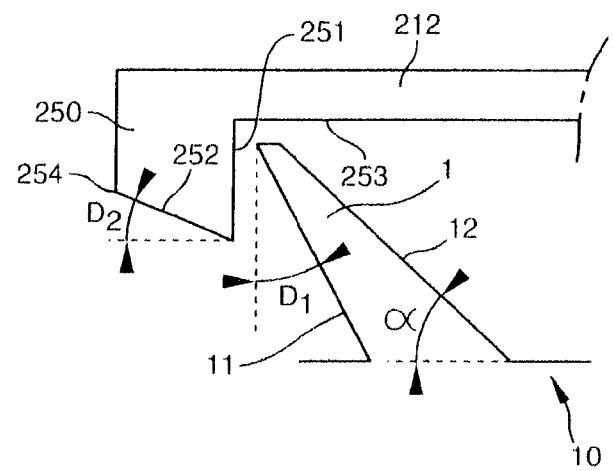
FIG. 4 schematically illustrates the shape of the teeth of the element to be driven and the shape of the driving element.

FIG. 4 schematically illustrates the shape of a tooth 1 of the wheel 10 and the shape of the driving tooth 250.

As this may be seen in this figure, the tooth 1 of the wheel 10 comprises a driving face 11 onto which the driving tooth 250 comes into contact in order to pull the wheel 10 during the first alternation (a) and a guiding face 12 on which the driving tooth 250 slides during the second alternation (b) of the driving cycle.

The driving face 11 is oriented to form a clearance angle D1 relatively to the radial direction of the wheel 10, the clearance angle D1 being preferably comprised between about 5 and 15 degrees.

The guiding face 12 of the tooth 1 is oriented to form an angle $\alpha$ as small as possible, relatively to the tangential direction of the wheel. The angle $\alpha$ is preferably comprised between about 20 and 60 degrees.

The driving tooth 250 comprises a driving face 251 intended to come into contact with the wheel 10 in order to pull the wheel 10 during the first alternation (a), a guiding face 252 intended to slide on the wheel 10 during the second alternation (b) and a supporting face 253 intended to press onto the wheel in order to limit engagement of the driving tooth 250 between the teeth of the wheel 10.

The driving face 251 is oriented to form a zero angle relatively to the radial direction of the wheel 10.

The guiding face 252 is oriented to form an angle D2 relatively to the tangential direction of the wheel 10, the angle D2 being preferably comprised between about 0 and 30 degrees.

The supporting face 253 is oriented to form a zero angle relatively to the tangential direction of the wheel 10. The supporting face 253 and the guiding face 251 thereby form a shoulder which limits the engagement of the driving tooth 250 between the teeth of the wheel 10.

The driving faces 11 and 251 are not parallel to each other but they form an angle D1. This feature has the effect of limiting the contact surface between the driving faces 11 and 251 which may lead to irreversible adhesion between the driving tooth 250 and the tooth 1 of the wheel when the driving tooth 250 pulls the wheel 10.

Also, the guiding faces 12 and 252 are not parallel to each other but form an angle. This feature has the effect of limiting the contact surface between the guiding faces 12 and 252 which may lead to irreversible adhesion between the driving tooth 250 and the tooth 1 of the wheel 10 when the driving tooth 250 slides on the wheel 10. Thus, the guiding faces 12 and 252 are in contact at a point 254 of the guiding face 252 of the driving element 250.

Moreover, the shoulder formed by the supporting face 253 and the guiding face 251 of the driving tooth 250 prevents the driving tooth 250 from being blocked between the teeth of the wheel 10. Indeed, penetration of the driving tooth 250 into the bottom of the teeth of the wheel 10 may possibly lead to irreversible blocking of the driving device.

Figure 5:
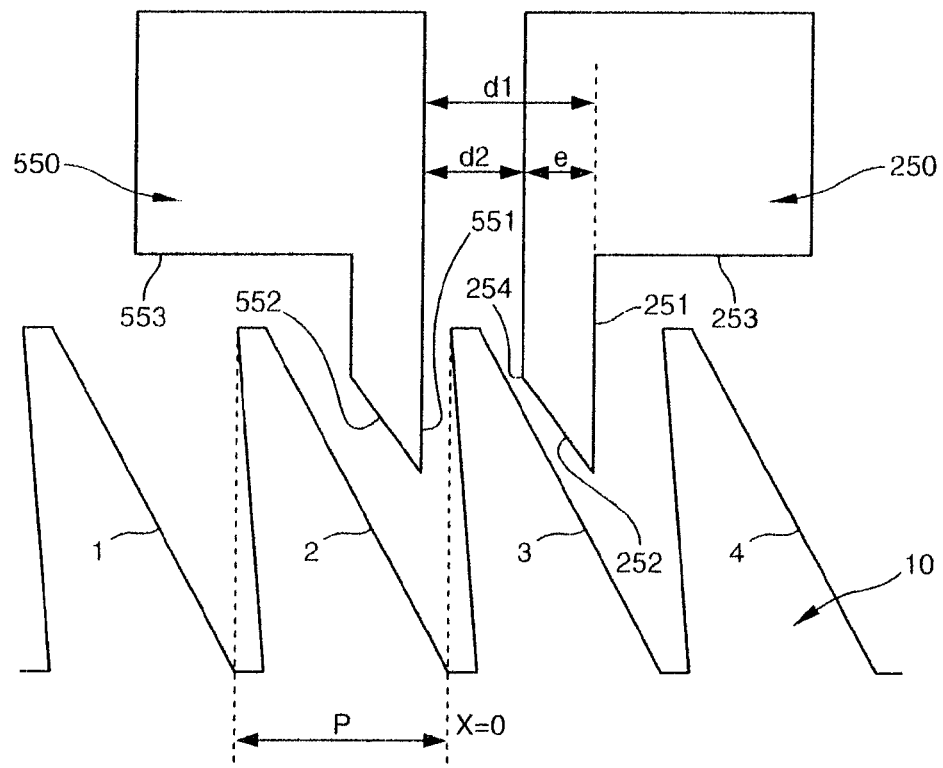
FIG. 5 schematically illustrates the positioning of the driving element and of the non-return pawl.

FIG. 5 schematically illustrates the positioning of the driving element 250 and of the indexing element 550 in the rest position (i.e., when the actuating element 202 is not powered).

The driving element 250 and the indexing element 550 have similar shapes.

The indexing element 550 comprises a blocking face 551 intended to come into contact with the wheel 10 in order to block the wheel 10 during the second alternation (b), a guiding face 552 intended to slide on the wheel 10 during the first alternation (a) and a supporting face 553 intended to come and press on the wheel 10 in order to limit the engagement of the indexing tooth 550 between the teeth of the wheel 10.

It is considered that the actuating element 202 generates a reciprocating movement, the amplitude of which is Δ. In other words, Δ is the stroke of the actuating element.

In order that the driving element 250 crosses a tooth of the wheel 10 during the second alternation (alternation b), the residual elastic deformation of the actuating element 202 needs to be sufficient so as to allow the driving element 250 to slide on the wheel 10 when the driving element 250 is at the top of the tooth to be crossed (as illustrated in FIG. 3, in configuration I).

When the driving element 250 is at the top of the tooth to be crossed, the residual elastic deformation is geometrically defined as follows:

$$\Delta_{residual} = p - e - d_2 + k \cdot p \quad [1]$$

wherein:

$\Delta_{residual}$ is the residual elastic deformation of the actuating element, p is the step of the wheel 10, e is the distance between the contact point 254 of the guiding face 252 and the driving face 251 of the driving element 250, $d_2$ is the distance between the contact point 254 and the blocking face 551 of the indexing element 550, and k is a positive integer.

In the operation of the device, the residual elastic deformation defined by the relationship [1] should be positive and in the relative positioning of the driving element 250 and of the indexing element 550, as illustrated in FIG. 5, the distance $d_2$ should be positive. In other words, the distance $d_2$ should generally be larger than a k multiple of the step of the wheel 10 if k+1 teeth of the wheel 10 are intercalated between the driving element 250 and the indexing element 550, i.e.:

$$\begin{cases} p - e - d_2 + k \cdot p \succ 0 \\ d_2 \succ k \cdot p \end{cases} \quad [2]$$

wherefrom:

$$k \cdot p \prec d_2 \prec p - e + k \cdot p \quad [3]$$

If for example k=0 (as illustrated in FIG. 5) is selected, $$0 \prec d_2 \prec p - e \quad [4]$$

is obtained.

For example, if the following parameters are considered:
p=15 μm
e=5 μm
One should have:

$$0 \prec d_2 \prec 10 \, \mu m \quad [5]$$

If k=1 is selected, one should have:

$$15 \, \mu m \prec d_2 \prec 25 \, \mu m \quad [6]$$

If k=2 is selected, one should have:

$$30 \, \mu m \prec d_2 \prec 40 \, \mu m \quad [7]$$

The invention claimed is:

1. A device comprising an element to be driven, a driving element intended to engage with the element to be driven and an actuating element capable of generating an reciprocating movement for displacing the driving element, the driving element and the actuating element being formed by etching in a semiconductor material block, wherein:

during a first alternation (a) of movement generated by the actuating element, the driving element engages with the element to be driven to pull the element to be driven, the driving element and the element to be driven have flat driving faces that are not parallel to each other and form an angle (D1), and during a second alternation (b) in the opposite direction generated by the actuating element, the driving element slides on the element to be driven, such that the element to be driven is displaced in a step-by-step movement by the driving element.

2. The device according to claim 1, wherein the driving element and the element to be driven have guiding faces that are not parallel to each other and form an angle.

3. The device according to claim 1, wherein the driving element has a driving face for contacting the element to be driven to pull the element to be driven during the first alternation (a) and a guiding face to slide on the element to be driven during the second alternation (b).

4. The device according to claim 1, wherein the driving element comprises a supporting face to limit engagement of the driving element with the element to be driven.

5. The device according to claim 4, wherein:

during the first alternation (a), the driving element is engaged between two teeth of the element to be driven, and during the second alternation (b), the driving element crosses one of the two teeth and engages between two other adjacent teeth of the element to be driven.

6. The device according to claim 5 in a combination, wherein the driving element crosses one of the two teeth by returning elastic energy stored in the flexible leaf.

7. The device according to claim 3, wherein the driving element comprises a supporting face to limit engagement of the driving element with the element to be driven.

8. The device according to claim 7, wherein:

during the first alternation (a), the driving element is engaged between two teeth of the element to be driven, and during the second alternation (b), the driving element crosses one of the two teeth and engages between two other adjacent teeth of the element to be driven.

9. The device according to claim 1, wherein the element to be driven is a toothed element.

10. The device according to claim 1, wherein the teeth of the element to be driven are asymmetrical.

11. The device according to claim 10, wherein each tooth of the element to be driven has a driving face onto which the driving element comes into contact to pull the element to be driven during a first alternation (a) and a guiding face on which the driving element slides during a second alternation (b).

12. The device according to claim 9, wherein each tooth of the element to be driven has a driving face onto which the driving element comes into contact to pull the element to be driven during a first alternation (a) and a guiding face on which the driving element slides during a second alternation (b).

13. The device according to claim 1, wherein the driving element comprises at least one flexible leaf wherein during the first alternation (a), the driving element is displaced in a first direction, causing deformation of the flexible leaf, and during the second alternation (b), the driving element is displaced in a second direction, opposite to the first direction, by elastic return of the flexible leaf.

14. The device according to claim 13 in a combination, wherein the driving element crosses one of the two teeth by returning elastic energy stored in the flexible leaf.

15. The device according to claim 1, comprising a non-return pawl capable of blocking the element to be driven during the second alternation (b).

16. The device according to claim 15, wherein the non-return pawl comprises an indexing element capable of:
during the first alternation (a) of the movement generated by the actuating element, sliding on the element to be driven, and
during the second alternation (b), engaging with the element to be driven to block the element to be driven.

17. The device according to claim 16, wherein the pawl comprises a guiding face to slide on the element to be driven during the first alternation (a) and a blocking face onto which the element to be driven comes into contact in order to block the element to be driven during the second alternation (b).

18. The device according to claim 15, wherein the pawl comprises a guiding face to slide on the element to be driven during the first alternation (a) and a blocking face onto which the element to be driven comes into contact in order to block the element to be driven during the second alternation (b).

19. The device according to claim 1, wherein the element to be driven is a toothed element having a step, the driving element comprises a guiding face intended to come into contact with the element to be driven at a contact point during the sliding of the driving element on the element to be driven, and wherein, at rest:

$$\begin{cases} d_2 \prec p - e + k \cdot p \\ d_2 \succ k \cdot p \end{cases}$$

wherein:
p is the step of the element to be driven,
e is the distance between a contact point of the guiding face and the driving face of the driving element,
$d_2$ is the distance between the contact point of the guiding face of the driving element and the blocking face of the pawl,
and k is a positive integer.

20. The device component according to claim 1, comprising an elastic pre-stressing component to maintain the driving element against the element to be driven.

21. The device according to claim 1, wherein the driving element comprises a supporting face to limit engagement of the driving element with the element to be driven.

22. The device according to claim 21, wherein:
during the first alternation (a), the driving element is engaged between two teeth of the element to be driven, and
during the second alternation (b), the driving element crosses one of the two teeth and engages between two other adjacent teeth of the element to be driven.

23. A method for operating a device comprising an element to be driven, a driving element and an actuating element, the driving element and the actuating element being formed by etching in a semiconductor material block, the method comprising:
controlling the actuating element to generate a reciprocating movement for displacing the driving element,
during a first alternation (a) of the movement generated by the actuating element, engaging the driving element with the element to be driven to pull the element to be driven, and limit contact between flat driving faces of the driving element and of the element to be driven, and
during a second alternation (b) in the opposite direction, generated by the actuating element, sliding the driving element on the element to be driven, and limit the contact surface between the driving element and the element to be driven,
such that the element to be driven is displaced in a step-by-step movement by the driving element.

* * * * *

UNITED STATES PATENT AND TRADEMARK OFFICE
CERTIFICATE OF CORRECTION

| | | |
|---|---|---|
| PATENT NO. | : 7,768,161 B2 | |
| APPLICATION NO. | : 11/886512 | |
| DATED | : August 3, 2010 | |
| INVENTOR(S) | : Patrice Le Moal et al. | |

It is certified that error appears in the above-identified patent and that said Letters Patent is hereby corrected as shown below:

In Claim 4, column 8, line 34, replace "The device according to claim 1" with --The device according to claim 3--.

In Claim 10, column 8, line 60, replace "The device according to claim 1" with --The device according to claim 9--.

Signed and Sealed this

Thirteenth Day of September, 2011

David J. Kappos
*Director of the United States Patent and Trademark Office*